July 5, 1955

A. E. BENNETT ET AL 2,712,236

SURFACE TEMPERATURE MEASURING DEVICES

Filed Feb. 16, 1951

INVENTORS:
ANDREW E. BENNETT
AND DANIEL S. BROWN
by Cameron MacLeod
Atty.

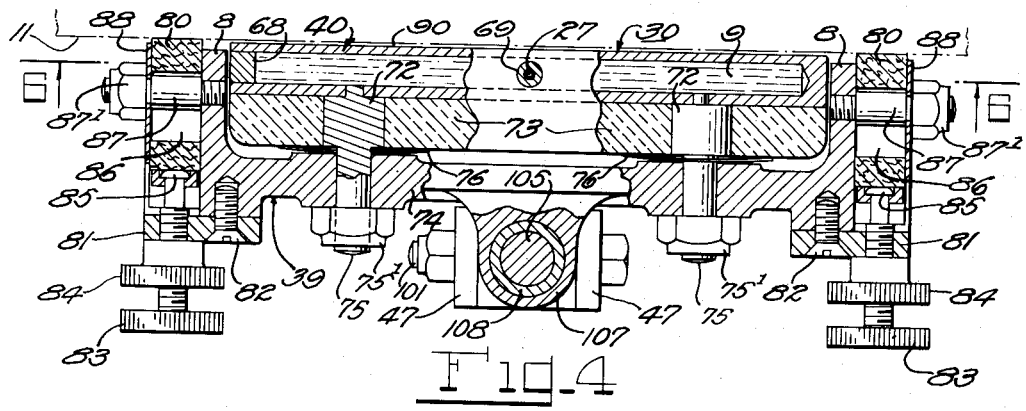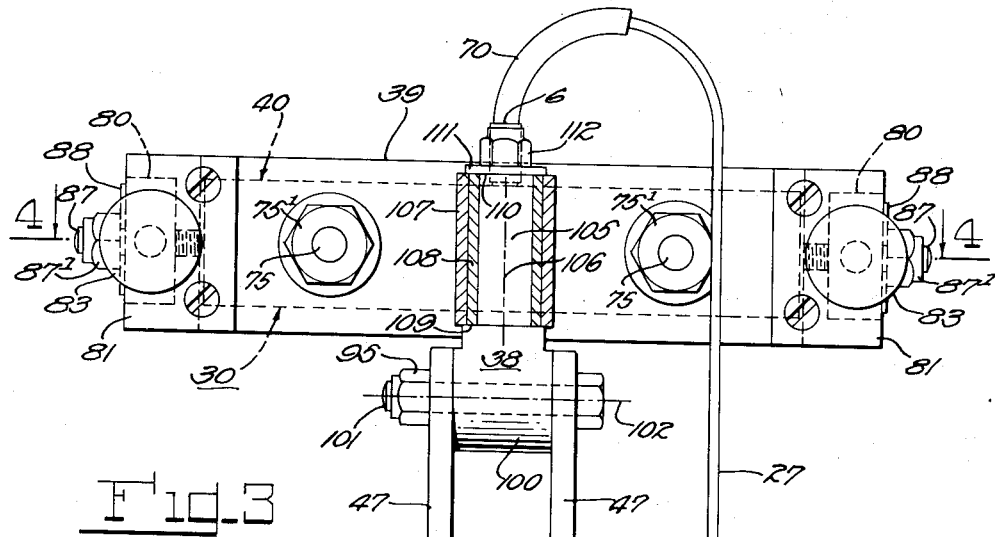

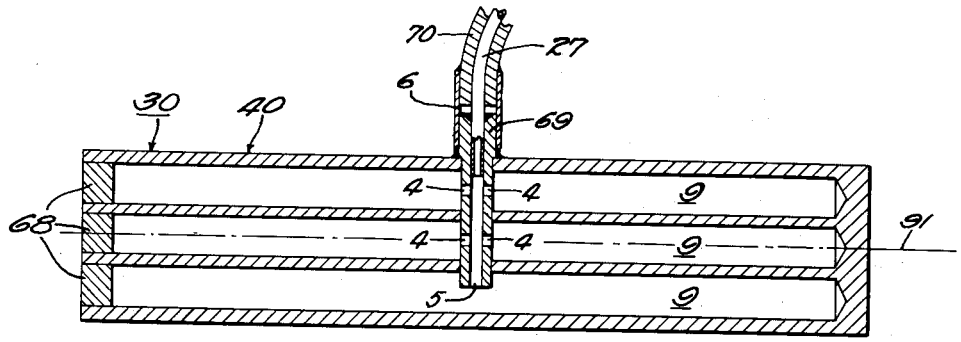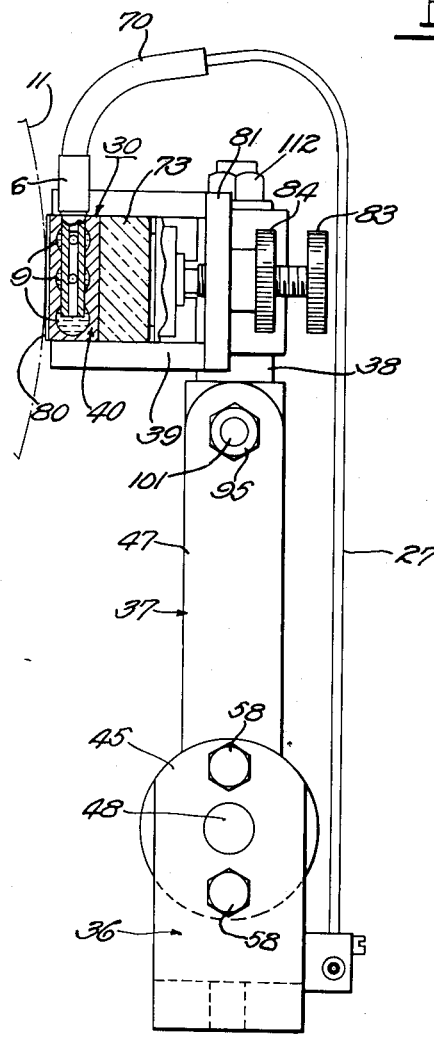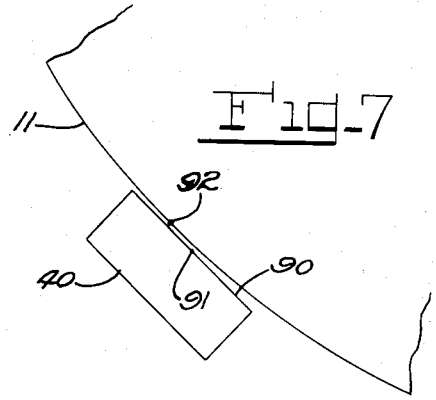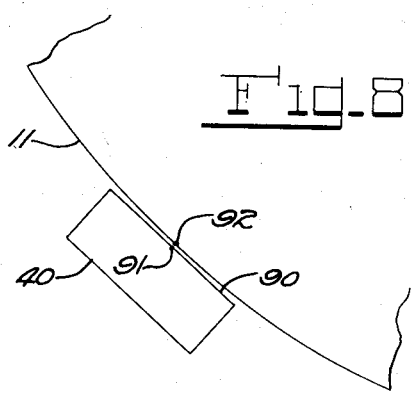

United States Patent Office 2,712,236
Patented July 5, 1955

2,712,236

SURFACE TEMPERATURE MEASURING DEVICES

Andrew E. Bennett, Hingham, and Daniel S. Brown, North Quincy, Mass., assignors to Mason-Neilan Regulator Company, Boston, Mass., a voluntary association doing business under the laws of Massachusetts Application February 16, 1951, Serial No. 211,336

13 Claims. (Cl. 73—351)

This invention relates to devices for measuring the surface temperature of a rotating or otherwise moving body used for drying purposes in a machine suitable for reducing the moisture content of material such as paper sheet, fabric, yarn and the like, or for measuring the surface temperature of such material as it passes or leaves the machine. Among other things the device embodying this invention may be employed for measuring the surface temperature of rotating drying rolls, commonly used in the textile and paper industries, including rolls of relatively large size as are used, for example, in so-called Yankee Driers for drying paper sheet, as tissue and the like. Rolls of the last mentioned type require the roll surface temperature to be maintained within close limits during the operating period if a uniform quality of paper is to be obtained, and especially during the warm-up period, if damage to the roll is to be avoided. And this invention particularly relates to surface roll temperature measuring devices of the character comprising a fluid system either of the liquid filled or vapor pressure type and normally including a bulb, capillary and associated expansible element, which may be used for indicating, recording, and/or controlling the surface temperature.

While the device embodying this invention is applicable to rolls for various purposes and of different sizes, its application to Yankee Drier rolls will be hereinafter described since the conditions attendant to their operation are particularly exacting. The roll of a Yankee Drier of modern design may be on the order of 12' 0" diameter by 100" long having a cylindrical wall thickness of approximately 1½". These rolls are preferably of cast iron and may obtain a surface speed as high as 3000' per minute. When light tissue, for example, is being run, the operating temperature of the roll surface which is in contact with the paper sheet may be 195° F., a temperature which must be closely adhered to if satisfactory results are to be obtained. Because of the surface cooling effect produced by the paper sheet, it has been found that in order to maintain a roll surface temperature of 195° F., an internal roll temperature of substantially 400° F. is required. Thus the temperature differential across the cylindrical wall of the roll is approximately 200° F., and for this reason it becomes necessary to respond to the roll surface temperature if accurate results are to be obtained.

As is well known to those skilled in the paper drying machine art, it is customary to provide the surface of a Yankee Drier roll with a coating which serves to cause the paper sheet to adhere closely to the roll surface, as is required for uniform drying. And since the coating is easily damaged by undue friction as would be caused, for example, by a contacting bulb of copper or equivalent material, and since friction in itself produces an error in the temperature response, it becomes necessary to provide means for maintaining a predetermined clearance between the bulb and the surface of the roll.

And in this connection it has also been found that accurate measurements well within the accuracy tolerances permissible may be obtained without surface contact by means of a measuring element in the form of a bulb of suitable material having sufficient fluid capacity for the purpose, a bulb preferably not less than 6" long, provided the bulb is held within a surface clearance of between .002" and .005" throughout the bulb length. And further in this connection we have discovered that substantial dimensional changes occur in the cylindrical surface of the roll caused by expansion during the warm-up period and by unequal expansion due to the difference in temperature between the ends of the roll and that portion of the cylindrical surface which is engaged by a wet sheet of paper. And again in this connection we have discovered that if the bulb is conveniently disposed, near one end of the paper engaging portion of the roll surface, with the longitudinal axis of the bulb substantially in parallel with the axis of the roll when the roll is at atmospheric temperature and with a surface clearance throughout the bulb length of approximately .003", when the roll is engaged by the sheet and the paper engaging surface of the roll is at 195° F., said surface develops a concavity and the clearance varies throughout the bulb length by an amount which is far in excess of the permissible limit of .002" and .005" within which the clearance must be held for accurate results.

It will be understood by those skilled in the paper drying machine art that a large roll of the type used in a Yankee Drier must be warmed up from atmospheric to operating temperature at a relatively slow rate if serious damage to the roll is to be avoided, and that the temperature rise during the warm-up period must be held within close limits. Since dimensional changes occur during the warm-up period and since the concavity of the roll occurs when the cylindrical surface is engaged by a wet sheet, the problem presented with a measuring element in the form of a noncontacting bulb, of a size to obtain sensitive responses to changes in surface temperature, is to maintain the bulb throughout its width and length within the permitted clearance limits, during the warm-up period, the operating period, and the period directly after the paper leaves the machine, in which last mentioned period the roll surface temperature may rise to 240° F.

It is an object of this invention to provide a device, including a capillary system, for the measurement of the surface temperature of a rotating or otherwise moving body suitable for drying material such as paper sheet, fabric, yarn and the like, or for measuring the surface temperature of such material as it passes through or leaves a drying machine.

It is an object of this invention to supply a device, including a capillary system, which will accurately measure the surface temperature of a roll under the conditions outlined hereinabove.

It is an object of this invention to provide a device of the thermal fluid type including a suitable metallic bulb, having ample fluid capacity, which is maintained at a predetermined clearance from the surface of a roll and which is capable of responding accurately to changes in surface temperature over a wide range of temperature change without injuring either the roll surface or a coating which may be applied thereto.

It is an object of this invention to provide a device of the thermal fluid type including a bulb having a substantially flat surface adapted to have a noncontacting relation with the cylindrical surface of a roll, and being of sufficient length and width to provide an ample capacity of fluid for the purpose, together with means for obtaining a substantially uniform mean clearance between the roll surface and bulb surface transversely of the latter under normal dimensional changes in the cylindrical surface of a roll, whereby accurate responses to changes in roll surface temperature may be obtained.

It is an object of this invention to provide a device, comprising a noncontacting bulb forming a part of a fluid filled thermal system and capable of responding accurately to changes in roll surface temperature, which may consist of standard parts, may be readily mounted at any convenient position either above or below the roll, and which includes means for automatically varying the position of the bulb proportionally with dimensional changes in roll surface to maintain the clearance not only throughout the bulb width but throughout the bulb length within allowed tolerance limits.

It is another object of this invention to provide a device, comprised of standard parts and including a fluid filled thermal system, which is adapted for use with rolls of various sizes and is not affected by foreign matter on the roll surface, such as lint and the like.

These and other objects of this invention will be more clearly understood from the following description when taken in connection with the accompanying drawings, wherein:

Fig. 3 is an enlarged plan view of the temperature measuring device shown in Figs. 1 and 2;

Fig. 4 is a section taken substantially on the line 4—4 of Fig. 3;

Fig. 5 is an end view, partly in section, of the device shown in Fig. 3;

Fig. 6 is a section of the temperature bulb taken on the line 6—6 of Fig. 4; and Figs. 7 and 8 are diagrams.

Figure 1:
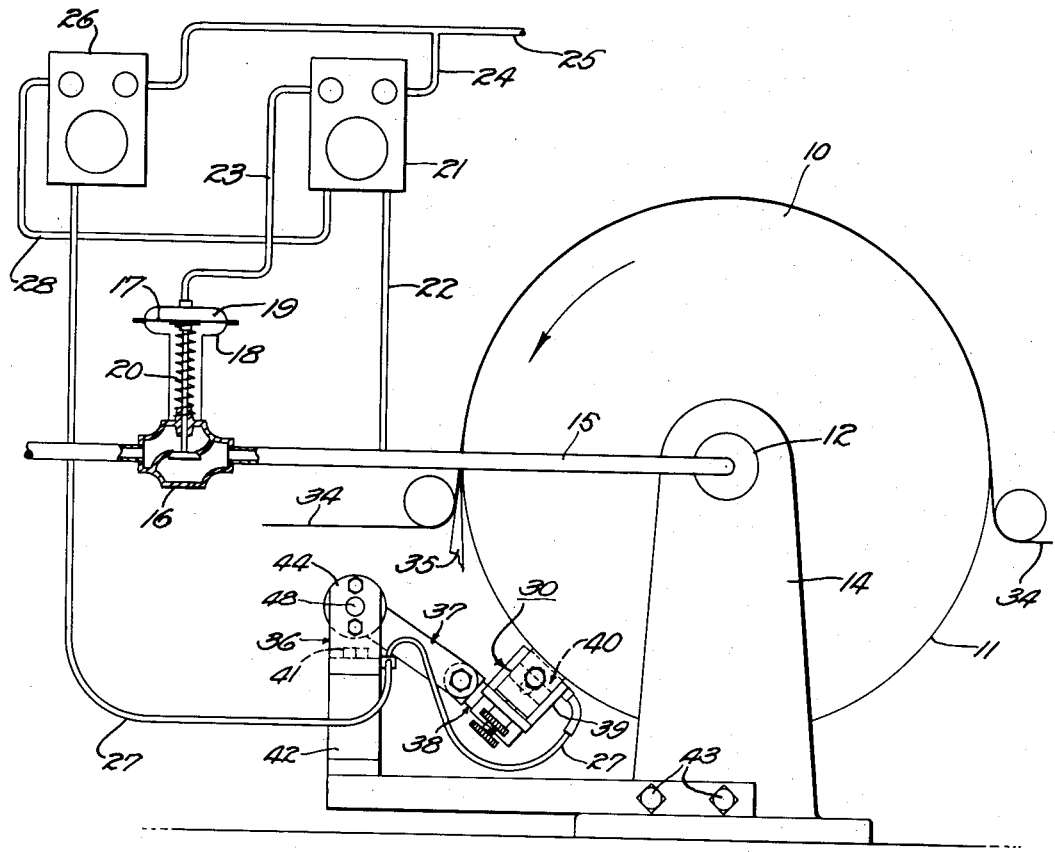
Fig. 1 is a generally diagrammatic view showing a paper drying roll to which is applied a temperature control system including a temperature measuring device embodying the present invention.
Figure 2:
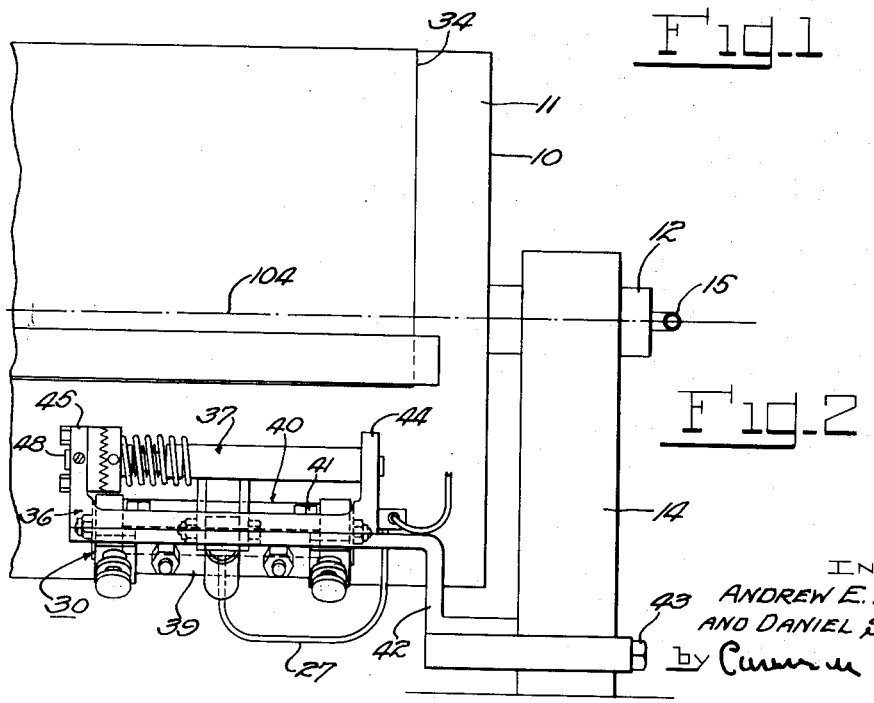
Fig. 2 is a side elevation of a portion of the drying roll shown in Fig. 1 with the measuring device applied thereto.

Having reference to the drawings and particularly to Figs. 1 and 2 there is shown one end of a Yankee Drier roll 10 having a cylindrical surface 11 and mounted on a shaft 12 journalled in bearings in standards 14. The shaft 12 is provided with a central bore through which steam may enter the roll as supplied by a pipe 15 from a source, not shown. Steam flow through the pipe 15 is governed by a valve 16 which is herein shown as operated by a diaphragm 17 mounted in a casing 18 and forming one wall of a chamber 19 the pressure in which is opposed by a spring 20 in the usual manner. As herein illustrated the valve 16 is governed by a pressure controller 21 of the air-operated type and for this purpose is connected with the pipe 15 downstream of the valve 16 by means of a pipe 22 and with the diaphragm chamber 19 of said valve by means of a pipe 23. The controller 21 receives a supply of regulated air pressure through pipes 24 and 25 from a source not shown and functions to maintain a set pressure in the roll 10. An instrument 26, also of the air-operated type, receives a supply of air from the pipe 25 and responds to temperature changes in the cylindrical surface 11 of the roll 10 as measured by a device 30 to which it is connected by means of a capillary tube 27. The capillary tube 27 is a part of a fluid filled thermal system and connects at one end with a bulb 40, to be described, and at the other end with an expansible element, not shown, of any well-known construction, mounted in the instrument 26. Output pressure from the instrument 26 is connected with the controller 21 by means of a pipe 28 and functions to vary the control point setting of controller 21 proportionally to temperature changes on the cylindrical surface of the roll 10 in a manner well-known to those skilled in the art. Thus the pressure is varied in the roll 10 as required to maintain the roll surface at the temperature desired. As viewed in Fig. 1, the roll 10 is rotating in a counterclockwise direction, indicated by the arrow, and a paper sheet illustrated at 34, passes over the roll and is separated therefrom by a doctor blade 35 in the usual manner.

The surface temperature measuring device 30 may be mounted on one of the roll standards 14 to be positioned at the roll surface within that area engaged by the paper sheet, preferably from four to six inches from one side of said area and near that portion of the roll surface from which the sheet has just been separated. Thus the device 30 is in a position to respond to temperature changes on that portion of the roll which is effective for sheet drying purposes.

Referring to Figs. 3, 4 and 5, the roll surface temperature measuring device generally comprises a mounting member 36, a support arm 37 rotatably connected thereto, a positioning arm 38 adjustably secured to the support arm, and a frame 39 carrying a bulb 40, the frame being pivotally connected to the positioning arm. The mounting member 36 may be secured, as by bolts 41, to a bracket 42 which in turn may be secured by bolts 43 to a standard 14, all as shown in Figs. 1 and 2.

Referring particularly to Fig. 3, the mounting member 36 is provided with legs 44 and 45 between which the support arm 37, comprising a sleeve 46 having arms 47 in the form of a clevis, is mounted. For this purpose the legs 44 and 45 are bored to receive a shaft 48 to which they are secured in any well-known manner, as by set screws 49. The shaft 48 is surrounded by the sleeve 46 over a portion only of its length, the sleeve being provided with an annular recess at each end for the reception of bearings 50 and 51 to enable the sleeve to be readily rotated about the shaft. A collar 52 is secured to the shaft 48 by means of a set screw 53 at a point adjacent that end of the sleeve 46 within which the bearing 51 is received and together with the leg 44 serves to fix the axial position of the sleeve on the shaft and to operate as a spacer in a manner to be described.

It will be understood from the general description set forth hereinabove that the surface location of the temperature measuring device 30 depends on how the material being dried is passed around the roll 10 and also upon the direction of roll rotation. If, for example, the sheet is passed over the top of the roll and the roll is rotating in a counterclockwise direction as viewed in Fig. 1, the device should be located at the left-hand lower side of the roll as therein illustrated. If the roll rotates in the opposite direction, the device should be located on the right-hand lower side of the roll. On the other hand, if the sheet is passed around the bottom of the roll, the device should be located either on the upper right-hand or left-hand side of the roll depending on whether the roll is rotating counterclockwise or in the reverse direction. And the device embodying this invention is adapted to be made of standard parts and to be suitable for left or right hand mounting either above or below the roll without structural change.

To provide means for maintaining the temperature measuring device at the roll surface in any suitable location, a pair of collars 55 and 56 having cooperating serrations 57 are mounted on the shaft 48. The collar 55 is provided with a hub 55¹ and is secured to the leg 45 of the mounting member by cap screws 58, and the cooperating collar 56 is provided with a hub 56¹ and is rotatably mounted on the hub 55¹ of the collar 55. The collar 56 has an opening 59 in a face 60 thereof into which opening the end of a helical spring 61 is received. The other end of the spring 61 surrounds a cap screw 62 which is threaded into an arm 47 of the support arm 37 and serves to clamp that end of the spring securely to the support arm, the arrangement being such that the spring surrounds the spacer collar 52 without contact therewith. At the inner end of the hub 56¹ and spaced slightly from the inner end of the hub 55¹ is a washer 63 and a spacer spring 64 encircles the shaft 48 within the spring 61 and is confined between the washer 63 and the spacer collar 52. The serrations 57 of the collars 55 and 56 are maintained in engagement by the spring 64 which serves to hold the collar 56 against rotation under any normal torque afforded by the spring 61. Holes 65 are provided in the periphery of the collar 56 for the reception of a suitable tool, not shown, whereby the collar may be rotatably adjusted in either direction, thereby tending to rotate the sleeve 46 in either sense selected under any desired spring tension. By means of the spacer collar 52 and the spring 64 the desired tension may be provided to the spring 61 by the adjustment collar 56 without any tendency for the spring 61 to cause the bearing 51 of the sleeve to bind on the shaft 48. In order to positively lock the collar 56 at the adjusted position, we provide a set screw 66 which threads into the collar and engages the hub portion $55^1$ of the collar 55.

The temperature measuring device 30, which is supported on the arms 47 in a manner to be described, includes the bulb 40 which is disposed between legs 8 of the frame 39. The bulb consists of a rectangular block of copper or equivalent material having a high coefficient of heat conductivity and provided with a plurality of longitudinally disposed bores 9 which are sealed at one end by plugs 68 and extend in close proximity to the other end of the block. Means for connecting the bores 9 is in the form of a cross bore for the reception of an extension tube 69. The central passage 5 in the extension tube is directly connected to one of the bores 9, the other two bores being connected with the central passage by means of holes 4. The capillary tube 27 extends through a protector tube 70 into the passage 5 of the extension tube at its outer end. Tubes 69 and 70 are connected by means of a sleeve 6, the joints between the parts being sealed pressure tight, as by solder. The tube 27 is preferably supported by a clip 71 secured to the leg 45 of the mounting member and at its opposite end the tube connects in the usual manner with a Bourdon tube or equivalent expansible element, not shown, in the instrument 26. Thus the bores 9, the capillary 27 and the expansible element in the instrument 26 constitute a sealed pressure system when filled with any suitable type of expansible fluid.

Means for connecting the bulb block 40 to the frame 39 is in the form of spacers 72 with which the block is provided and which extend through an insulating member 73 of any suitable material. The spacers 72 include threaded stud portions 75 which extend through suitable openings in a back portion 74 of the frame and are secured thereto by nuts $75^1$. Spring washers 76 are preferably disposed between the back portion 74 of the frame and adjacent insulating material 73. The parts are preferably so arranged that the bulb 40 extends slightly beyond the ends of the frame legs 8 all as shown in Fig. 4. In order that the bulb 40 may be disposed at a selected spacing from the roll surface, for example .003", we provide each end of the frame 39 with a shoe 80 of low-friction, low-coefficient-of-heat-conductivity material suitable to withstand any roll surface temperature to which it may be subjected, a material such as graphite impregnated asbestos or its equivalent. The shoes 80 are supported at each side of the frame 39 by means of plates 81 which project over the ends of the frame and may be secured thereto by screws 82. Threaded through the outer portion of each plate 81 is an adjustment screw 83 which has a lock nut 84 and at its inner end has a head 85 which forms a rotatable connection with the shoe 80 in the manner shown. Each shoe is slotted at 86 to receive a stud 87 which is threaded into a leg 8 of the frame and by means of a nut $87^1$ and a spring plate 88 through which the stud passes, is held in frictional engagement with the end face of the leg. Thus a vernier adjustment is provided by which the shoes at each end of the frame may be accurately positioned to provide any clearance desired between the rectangular surface or base 90 of the bulb and the adjacent cylindrical surface 11 of the roll. Since the shoes consist of a comparatively non-friction material, we have found that when the bulb frame 39 is in operative connection with the clevis arms 47 and the spring 61 of the support arm 37 is given a reasonably light tension tending to hold the shoes 80 against the roll surface, the shoes are subjected to very little wear and do not affect the roll surface or the usual coating that may be applied thereto.

In this connection we have also found that when a bulb 40 of suitable length and width is employed, accurate responses to roll surface temperature changes may be obtained provided the mean clearance between the roll surface 11 and bulb surface 90 at one side of the longitudinal center line of the bulb surface (shown by dotted line 91 in Fig. 6 and by point 91 in Figs. 7 and 8) is substantially equal to the mean clearance at the other side of said center line. A certain amount of difference in mean clearance is permissible provided the difference is maintained within relatively close limits. And further in this connection, it will be understood that the bulb must have a reasonably large fluid capacity and a relatively large surface area presented to the roll surface if accurate results are to be obtained. For example the bulb, herein illustrated and in successful operation, is on the order of 6" long by 1¼" wide by ½" thick, and with a bulb spacing between .002" and .005", the flat base surface 90 of the bulb may be tangential to the roll surface, the word "tangential" being herein used in an approximate sense, as much as 3/16" on either side of the longitudinal center line 91 of the bulb surface without noticeably affecting the accuracy of temperature measurement. This is illustrated in Figs. 7 and 8 which are exaggerated for purposes of illustration. It will be noted that in Fig. 8 the surface 90 of the bulb is tangential to the roll surface 11 at a point 92 on the longitudinal center line 91 of the bulb surface, whereas in Fig. 7 the point of tangent 92 is at one side of the point 91 on the center line of the bulb surface. This is important for when, as in a Yankee Drier roll, the cylindrical surface assumes a measurable concavity when engaged by a paper sheet and is at a temperature of 195° F., the bulb may be initially set, when the roll is at atmospheric temperature, with the point 92 of tangent at one side of the center line 91, as shown in Fig. 7. Thus when the roll surface is engaged by the sheet and the concavity occurs, the support arm 37 swings counterclockwise as viewed in Fig. 1 and the point of tangent moves from its initial position to the center line of the bulb. By this means the bulb may be maintained within effective clearance limits across its width throughout the period of roll operation. However it is necessary not only to maintain the bulb at an effective clearance across its width but to maintain this clearance throughout the bulb length. And the positioning member 38 functions together with the frame 39 and shoes 80 to accomplish both of these ends.

The positioning member 38 includes a base portion 100 which makes a close fit between the arms 47 of the clevis and is mounted on a shaft in the form of a bolt 101. The bolt 101 extends through suitable bores in the arms 47 of the clevis and the base portion 100 of the positioning member. The axis 102 of the bolt is arranged to be in parallel with the axis 103 of the shaft 48 on which the support arm 37 is mounted and substantially in parallel with the axis 104 of the roll 10 when the device is applied to the cylindrical roll surface. A nut 95, threaded on to the end of the bolt 101, serves to clamp the positioning member at any desired angular position in relation to the arms 47 of the clevis. The positioning member also includes a shaft 105 which is preferably integral with the base portion 100 of the positioning member and has an axis 106 which may be rotated about the bolt 101 in a plane which is normal to the axis 103 of the shaft 48 and is substantially normal to the roll axis 104 when the device is applied to the cylindrical surface of the roll. The frame 39 in which the bulb 40 is mounted is provided with an extension 107 having a through bore in which a bushing 108 is received. The shaft 105 is reduced to form a shoulder 109 and the reduced portion of the shaft extends through the extension 107 and makes a sliding fit with the bushing 108. The shaft 105 is again reduced to provide a second shoulder 110 and when the inner end of the extension 107 engages the first mentioned shoulder 109, the shoulder 110 is at a point just beyond the outer end of the extension. A washer 111 engages the shoulder 110 and extends over the end of the bearing 108, being held against the shoulder by a nut 112 threaded on the outer end of the shaft. The parts are so arranged that there is just enough clearance between the bearing 108 and the washer 111 to permit the frame 39 to rotate freely around the shaft 105.

By means of the arrangement just described the bulb 40 may be initially set at any desired angle to the arms 47 of the clevis and thus the point of approximate tangent between the base surface 90 of the bulb and the cylindrical surface 11 of the roll may be located at the longitudinal axis 91 of the bulb surface or at one side as required to meet the operating conditions so that the mean clearance between the bulb surface and the roll surface at one side of the axis 91 may be approximately equal to the mean clearance on the other side of said axis during the operating period. Furthermore by means of the rotatable connection formed by the shaft 105 on the positioning member and the extension 107 on the frame, the bulb may be rotated by the shoes 80 around the shaft and a mean clearance between the bulb and the roll surface, well within the permitted tolerance limits of .002″ and .005″, may be obtained throughout the bulb length. Thus a measuring device comprised of standard parts may be adapted to function with rolls of various sizes and the angular position required for the bulb to provide an effective clearance under various operating conditions may be readily obtained. And this is true whether the bulb is required to be located at the right or left hand side of the roll since the angle of the positioning arm may be adapted to that required. By means of the collar 56 the helical spring 61 may be tensioned to rotate the arms 47 in either direction, the construction being such that the bulb 40 may be reversed. Thus the device may be applied either to the right-hand or left-hand of the roll and the tension adjustment may be conveniently located.

We have found that under some operating conditions a certain amount of lint lodges on the roll surface and is apt to accumulate at a measuring element and around its associated parts to an extent to render the device inoperative. The device embodying this invention is so arranged that an accumulation of lint or other foreign matter will cause the bulb to ride over it, the accumulated weight of lint being thereafter thrown off the roll surface by the centrifugal force generated by the rapid rotation of the roll. Thus the device is self-cleaning and is capable of providing accurate surface temperature measurements without substantial interruption.

While we have illustrated a preferred embodiment of our invention, it will be understood that modifications may be made without departing from the scope of our invention as defined in the claims.

We claim:

1. A device for measuring the surface temperature of a moving body in connection with the drying of sheet material, comprising, a fluid filled thermal system including a bulb having a substantially flat base disposed at a selected operating position proximate to the surface of said moving body, pivotal means on which said bulb is mounted having an axis disposed transverse to the direction of movement of said moving body about which axis said bulb is freely movable when said bulb is at said selected operating position measuring the surface temperature of said moving body, and relatively rigid means in operative connection with said bulb engaging the surface of said moving body at points apart from the axis of said pivotal means and providing a selected minute unobstructed spacing between the base of the said bulb and the said surface, said spacing means coacting with said pivotal means for varying the position of the base of said bulb in accordance with positional changes in the surface of said moving body to maintain the said spacing throughout the base of said bulb.

2. A device for measuring the surface temperature of a moving body in connection with the drying of sheet material, comprising, a fluid filled thermal system including a bulb having a substantially flat base disposed at a selected operating position proximate to the surface of said moving body, a supporting member to which said bulb is rigidly secured, a support, a pivotal connection between the support and said bulb supporting member, said pivotal connection having an axis disposed transverse to the direction of movement of said moving body about which axis said bulb and supporting member are freely movable when said bulb is at said selected operating position measuring the surface temperature of said moving body, and relatively rigid means in operative connection with said bulb engaging the surface of said moving body at points apart from the axis of said pivotal connection and providing a selected minute unobstructed spacing between the base of said bulb and the said surface, said spacing means coacting with said pivotal connection for varying the position of said supporting member in accordance with positional changes in the surface of said moving body to maintain the said spacing throughout the base of said bulb.

3. A device for measuring the surface temperature of a moving body in connection with the drying of sheet material, comprising, a fluid filled thermal system including a bulb having a substantially flat base disposed at a selected operating position proximate to the surface of said moving body, means for urging said bulb towards said surface, a pivotal connection associated with said means and said bulb about which connection said bulb is free to rotate when said bulb is at said selected operating position measuring the surface temperature of said moving body, and relatively rigid means in operative connection with said bulb engaging the surface of said moving body at points apart from said pivotal connection for rotating said bulb about said connection and providing a selected minute unobstructed spacing between the base of the bulb and the surface of said moving body for rotating the bulb about said connection in accordance with positional changes in said surface to maintain said selected spacing throughout the base of the bulb.

4. A device for measuring the surface temperature of a moving body in connection with the drying of sheet material, comprising, a fluid filled thermal system including a bulb having a substantially flat base greater in length than width disposed at a selected operating position proximate to the surface of said moving body, means for urging said bulb towards said surface, a rotatable connection associated with said means and said bulb having an axis about which said bulb is freely rotatable when said bulb is at said selected operating position measuring the surface temperature of said moving body, the axis of said rotatable connection being substantially transverse to the longitudinal axis of said bulb, and relatively rigid means in operative connection with said bulb engaging the surface of said moving body at points apart from the axis of said rotatable connection and providing a selected minute unobstructed spacing between the base of said bulb and the surface of said moving body for rotating said bulb about said connection in accordance with positional changes in said surface to maintain said selected spacing throughout the base of the bulb.

5. A device for measuring the surface temperature of a moving body in connection with the drying of sheet material, comprising, a fluid filled thermal system including a fluid filled bulb having a substantially flat base disposed at a selected operating position proximate to the surface of said moving body, a frame in which said bulb is rigidly mounted, means for urging said frame and bulb towards the surface of said moving body, a pivotal connection having an axis disposed in a direction transverse to the direction of movement of said moving body and associated with said means and said frame about the axis of which connection the frame and bulb are rotatable when the bulb is at said selected operating position measuring the surface temperature of said moving body, and a plurality of relatively rigid shoes of substantially non-friction material adjustably connected with said frame and engaging said surface at points apart from the axis of said pivotal connection to provide a selected unobstructed spacing between said surface and the base of said bulb, about the axis of which connection said frame is rotated by said shoes to maintain the said selected spacing throughout the bulb base during positional changes in the surface of said moving body.

6. A device for measuring the surface temperature of a rotating roll, comprising, a fluid filled thermal system including a bulb having a substantially flat base of greater length than width and having a longitudinal axis normally disposed substantially in parallel with the roll axis, means for urging said bulb towards the cylindrical surface of said roll, pivotal means associated with said first means and said bulb having an axis of rotation disposed transverse to the axis of said bulb, said bulb being freely rotatable about the axis of said pivotal means as the surface of said roll moves relatively to said bulb and spacing means comprising a plurality of shoes in operative connection with said bulb and engaging the surface of said roll at points apart from the axis of said pivotal means for maintaining said bulb proximate to the cylindrical surface of said roll with a selected unobstructed minute spacing therebetween, and coacting with said spacing means for varying the axial position of said bulb in respect to the roll axis in accordance with dimensional changes in the said cylindrical surface to maintain the said selected spacing throughout the bulb length.

7. A device for measuring the surface temperature of a rotating roll, comprising, a fluid filled thermal system including a fluid filled bulb having a relatively large substantially flat surface, means for urging said bulb toward the cylindrical surface of said roll, means for providing a selected minute spacing between the said bulb surface and the said roll surface, said flat bulb surface having a longitudinal axis normally disposed substantially in parallel with the roll axis and a transverse axis approximately tangential with the cylindrical roll surface, and means for initially setting the point of approximate tangent between said bulb surface and said roll surface at selected points transversely of said bulb surface.

8. A device for measuring the surface temperature of a rotating roll, comprising, a fluid filled thermal system including a fluid filled bulb having a relatively large substantially flat surface disposed adjacent the cylindrical surface of said roll, said flat surface having a longitudinal axis normally disposed substantially in parallel with the roll axis and a transverse axis approximately tangential with said cylindrical roll surface, means for providing a selected minute spacing between the said bulb surface and the said roll surface, means for initially setting the point of approximate tangent between said bulb surface and said roll surface at selected points transversely of said bulb surface, and means for varying the axial position of said bulb in respect to the roll axis in accordance with dimensional changes in said cylindrical surface to maintain the said selected spacing throughout the bulb length.

9. A device for measuring the surface temperature of a rotating roll, comprising, a fluid filled thermal system including a fluid filled bulb having a relatively large substantially flat surface, a positioning member in operative connection with said bulb, a rotatably mounted support arm on which said positioning member is mounted, means for providing a selected minute spacing between the surface of said bulb and the cylindrical surface of said roll, the flat surface of said bulb having a point substantially tangential with the cylindrical surface of said roll, means for positioning said bulb at either side of said support arm with the bulb surface at a selected point of tangent with the roll surface, resilient means for rotating said support arm tending to urge said bulb toward said roll surface when positioned on one side of said support arm, and means for reversing the action of said resilient means tending to urge said bulb toward said roll surface when the bulb is positioned at the other side of said support arm.

10. A device for measuring the surface temperature of a rotating roll, comprising, a fluid filled thermal system including a relatively large fluid filled bulb having a longitudinal axis normally disposed substantially in parallel with the roll axis, a member supporting said bulb, a rotatably mounted support arm, a positioning member in operative connection with said support arm, said bulb supporting member being rotatably mounted on said positioning member, means tending to rotate said support arm in a direction to maintain said bulb adjacent the cylindrical surface of said roll, and spacing shoes between the bulb and the said cylindrical roll, the axis of rotation of said bulb supporting member being substantially normal to a plane defined by the axis of rotation of said roll and a line representing the shortest distance between said roll axis and the axis of rotation of said bulb supporting member and the rotatable mounting of said bulb supporting member coacting with said spacing shoes to vary the axial position of said bulb in respect to the roll axis in accordance with dimensional changes in the said cylindrical roll surface to maintain the said selected spacing throughout the bulb length.

11. A device for measuring the surface temperature of a rotating roll, comprising, a fluid filled thermal system including a bulb provided with a substantially flat surface having a longitudinal axis normally disposed substantially in parallel with the roll axis and a transverse axis approximately tangential with the cylindrical roll surface, a member supporting said bulb, a support arm, a positioning member in operative connection with said bulb supporting member, said positioning member having a rotatable connection with said support arm on an axis substantially in parallel with the axis of said roll, means associated with said support arm for urging said arm, positioning member and bulb toward said cylindrical roll surface, means providing a selected minute spacing between the said bulb surface and the said roll surface, and means for clamping said positioning member at selected rotary positions about the axis of said rotatable connection for initially setting the point of approximate tangent between said bulb surface and said roll surface at selected points transversely of said bulb surface.

12. A device for measuring the surface temperature of a rotating roll, comprising, a fluid filled thermal system including a bulb provided with a substantially flat surface having a longitudinal axis normally disposed substantially in parallel with the roll axis and a transverse axis approximately tangential with the cylindrical roll surface, a member supporting said bulb, a rotatably mounted support arm, a positioning member having a rotatable connection with said support arm on an axis substantially in parallel with the axis of said roll, said bulb supporting member having a rotatable connection with said positioning member on an axis substantially normal to a plane defined by the axis of said roll and a line representing the shortest distance between the said roll axis and the axis of said rotatable connection, means providing a selected minute spacing between the said bulb surface and the said roll surface, and means for clamping said positioning member at selected rotary positions about the axis of said rotatable connection for initially setting the point of approximate tangent between said bulb surface and said roll surface at selected points transversely of said bulb surface, the rotatable connection between said positioning member and said bulb supporting member coacting with said spacing means to vary the axial position of said bulb in respect to the roll axis in accordance with dimensional changes in the said cylindrical roll surface to maintain the said selected spacing throughout the bulb length.

13. A device for measuring the surface temperature of a rotating roll, comprising, a fluid filled thermal system including a bulb having a longitudinal axis normally disposed substantially in parallel with the axis of said roll, means for urging said bulb toward the cylindrical surface of said roll at a selected radial position thereon, a pivotal connection associated with said means and said bulb about which connection said bulb is free to rotate, said pivotal connection having an axis of rotation substantially normal to a plane defined by the axis of said roll and a line representing the shortest distance between the said roll axis and the axis of said pivotal connection, a plurality of shoes of substantially nonfriction material associated with said bulb and engaging the cylindrical surface of said roll, and means for varying the position of said shoes in respect to said bulb to provide a selected spacing between the bulb and the said cylindrical roll surface, said shoes coacting with said pivotal connection to vary the longitudinal axis of the bulb in respect to the axis of the roll in accordance with dimensional changes in the said cylindrical surface to maintain the said selected spacing throughout the bulb length.

References Cited in the file of this patent

UNITED STATES PATENTS

| | | |
|---|---|---|
| 1,220,635 | Hunter et al. | Mar. 27, 1917 |
| 1,626,060 | Witham, Jr. | Apr. 26, 1927 |
| 1,717,849 | Maynard | June 18, 1929 |
| 1,758,532 | Phinney | May 13, 1930 |
| 2,095,877 | Junkins | Oct. 12, 1937 |
| 2,197,823 | Young | Apr. 23, 1940 |
| 2,480,703 | Bradner et al. | Aug. 30, 1949 |